(12) United States Patent
Taguchi

(10) Patent No.: US 6,501,487 B1
(45) Date of Patent: Dec. 31, 2002

(54) WINDOW DISPLAY CONTROLLER AND ITS PROGRAM STORAGE MEDIUM

(75) Inventor: Tsuyoshi Taguchi, Fussa (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 09/494,114

(22) Filed: Jan. 27, 2000

(30) Foreign Application Priority Data

Feb. 2, 1999 (JP) .......................................... 11-025108

(51) Int. Cl.[7] .............................................. G06F 13/00
(52) U.S. Cl. ..................................................... 345/788
(58) Field of Search ................................ 345/784, 777, 345/708, 764, 781, 788, 797, 808

(56) References Cited

U.S. PATENT DOCUMENTS 5,227,771 A * 7/1993 Kerr et al. .................. 345/781
6,181,338 B1 * 1/2001 Brodhun ..................... 345/788
6,323,883 B1 * 11/2001 Minoura et al. ............ 345/784

FOREIGN PATENT DOCUMENTS

| JP | 62-5293 | 1/1987 |
| JP | 4-350720 | 12/1992 |
| JP | 6-202838 | 7/1994 |

* cited by examiner

Primary Examiner—Cao H. Nguyen
(74) Attorney, Agent, or Firm—Frishauf, Holtz, Goodman & Chick, P.C.

(57) ABSTRACT

The display size of a window as an object can be arbitrarily changed by simple operation without dragging a mouse. When an object on the display screen is designated by pressing a mouse button of an input device, a CPU changes the size of the designated object by gradually enlarging or reducing its size in accordance with the duration of time for which the mouse button is held down.

4 Claims, 8 Drawing Sheets

FIG.4A   POINTED POSITION   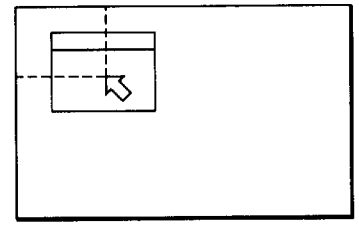
LEFT CLICK (BUTTON IS HELD DOWN)
FIG.4B   UPPER, LOWER, RIGHT, AND LEFT SIDE DIRECTIONS   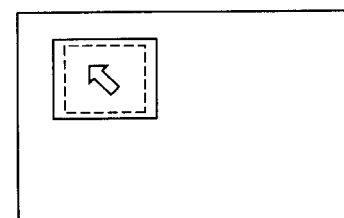
FIG.4C   UPPER, LOWER, RIGHT, AND LEFT SIDE DIRECTIONS   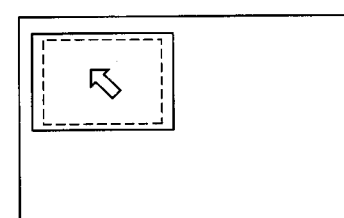
FIG.4D   LOWER AND RIGHT SIDE DIRECTIONS   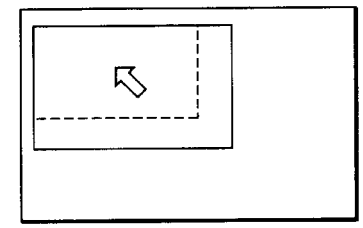
FIG.4E   RIGHT DIRECTION   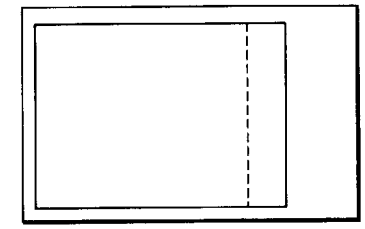
FIG.4F   RIGHT DIRECTION ↓ STOP   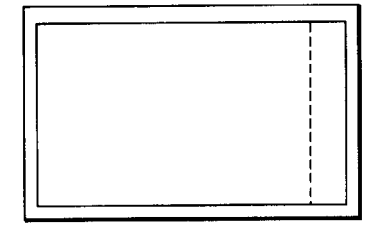

FIG.5A  POINTED POSITION
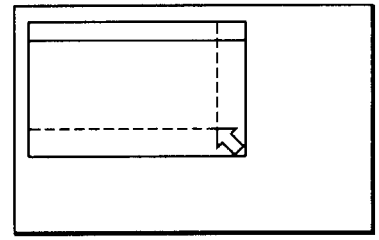
RIGHT CLICK (BUTTON IS HELD DOWN)
FIG.5B  UPPER AND LEFT SIDE DIRECTIONS
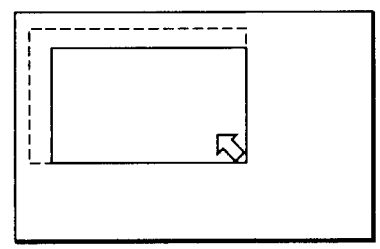
FIG.5C  MOVE POINTED POSITION
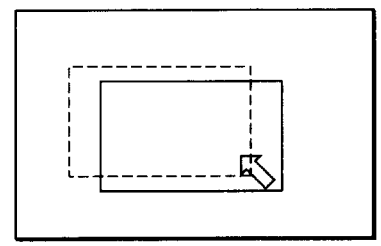
FIG.5D  MOVE POINTED POSITION REDUCE UPPER AND LEFT SIDES
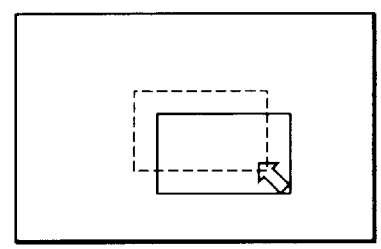
FIG.5E  MOVE POINTED POSITION REDUCE UPPER AND LEFT SIDES
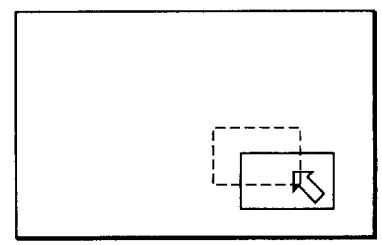

WINDOW DISPLAY CONTROLLER AND ITS PROGRAM STORAGE MEDIUM

BACKGROUND OF THE INVENTION

The present invention relates to a window display controller for controlling display of windows on a display screen, and its program storage medium.

Conventionally, as a typical example of the input/output method in a GUI (graphical user interface) system, a base frame called a desktop is displayed on the entire display screen, and when an icon on this desktop is pointed by a mouse pointer that moves on the desktop in accordance with movement of a mouse, a target program corresponding to that icon is launched. Upon launching the program, a rectangular window is displayed on the desktop. Note that the window, icon, and data in the window are associated with some data, and are called objects. The size of each object is changed by dragging the mouse.

In this case, the mouse is dragged as follows. That is, when the mouse pointer is adjusted to the frame of an object and then moved while a mouse button is held down, the object frame moves accordingly. After the object is changed to a desired size, the mouse button is released. When the object size is changed in this manner, cumbersome operation is required, i.e., the mouse pointer must be accurately adjusted to the object frame, and a work space for moving the mouse must be assured, resulting in poor operability. On the other hand, the icon and the window which is associated with the program that is launched upon clicking that icon are independently displayed, and have quite different display patterns although they express the identical program, resulting in visual or conceptual confusion.

BRIEF SUMMARY OF THE INVENTION

An object of the first invention is to arbitrarily change the window size by simple operation in place of dragging of the mouse.

An object of the second invention is to smoothly convert an icon and window.

The first invention is a window display controller for displaying display data stored in display data storage means within a window display region having an arbitrary display size, which is displayed on a display screen, characterized by comprising measurement means for measuring a designation operation time of a first or second designation operation with respect to a display position of the window display region, first size change means for enlarging the display size of the window display region in accordance with the designation operation time measured by the measurement means upon the first designation operation, second size change means for reducing the display size of the window display region in accordance with the designation operation time measured by the measurement means upon the second designation operation, and display control means for controlling to display the display data stored in the display data storage means within the window display region, the display size of which has been changed by the first or second size change means.

The second invention is a window display controller for displaying a window, on which predetermined display data is displayed within a display region thereof, on a display screen, characterized by comprising display size change means for sequentially enlarging a display size of an icon displayed on the display screen by a display size enlargement designation operation for the icon, conversion means for converting the icon into a window corresponding to the icon and opening a corresponding file when the display size of the icon has been enlarged beyond a predetermined size, and display control means for displaying the window converted by the conversion means on the display screen, and displaying display data of the opened file within the window.

According to the first invention, while a window that displays predetermined display contents is displayed on the display screen, the display size of that window is enlarged or reduced in accordance with the time of only enlargement or reduction designation operation made for that window, and display data in that window are displayed within the changed window display area. Hence, the window display size can be changed very easily, thus expecting great improvement of operability.

According to the second invention, when the display size of an icon displayed on the display screen is enlarged by a display size enlargement designation operation for that icon, the icon is automatically converted into a window of a file corresponding to that icon in accordance with the display size. Hence, smooth conversion from the icon to the window can be attained, and the window can be opened after the correspondence between the icon and window is made clear.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A through 4F are views showing the enlargement processes object size;

FIGS. 5A through 5E are views showing the reduction processes of the object size;

DETAILED DESCRIPTION OF THE INVENTION (First Embodiment)

The first embodiment of the present invention will be described below with reference to FIGS. 1 to 6C.

Figure 1:
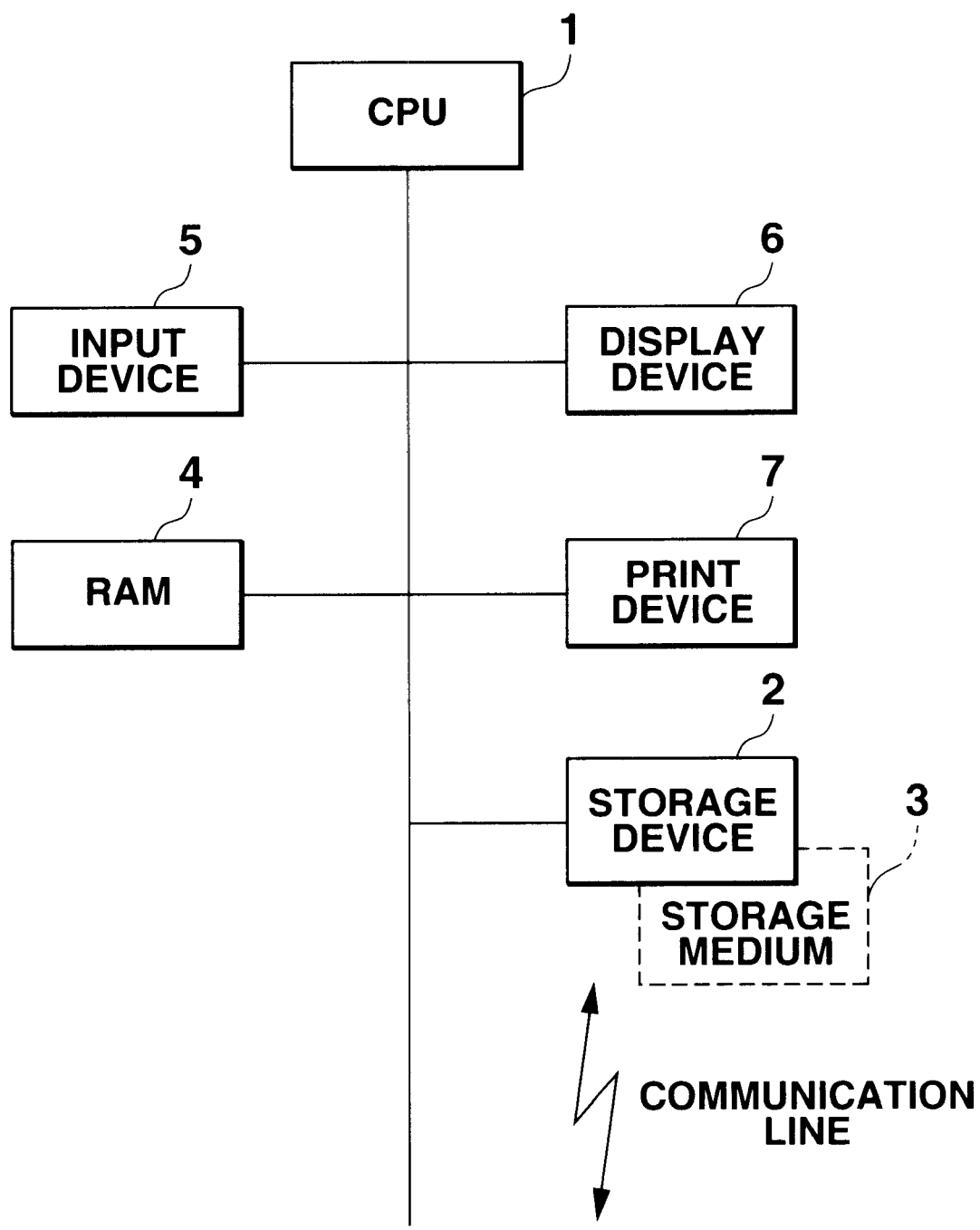
FIG. 1 is a block diagram showing the overall arrangement of an object processing apparatus.

FIG. 1 is a block diagram showing the overall arrangement of an object processing apparatus which can display windows.

A CPU 1 is a central processing unit which controls the overall operations of this object processing apparatus in accordance with various programs.

A storage device 2 has a storage medium 3 which pre-stores an operating system, various application programs, database, character font data, and the like, and its drive system.

The storage medium 3 may be either a fixed or detachable one, and comprises a magnetic/optical storage medium such as a floppy disk, hard disk, optical disk, RAM card, or the like, or a semiconductor memory.

The programs and data in the storage medium 3 are loaded onto a RAM 4 under the control of the CPU 1 as needed. Furthermore, the CPU 1 can receive programs and data sent from another device via a communication line or the like, and can store them in the storage medium 3, or can use programs and data stored in a storage medium provided in the other device via the communication line or the like.

An input device 5, display device 6, and print device 7 as input/output peripheral devices are connected to the CPU 1 via a bus line, and the CPU 1 controls their operations in accordance with an input/output program.

The input device 5 has a keyboard for inputting character string data and the like, and various commands, and a pointing device such as a mouse or the like.

Note that the display device 6 comprises a liquid crystal display device, CRT display device, or plasma display device, and the print device 7 comprises a non-impact printer such as a thermal transfer printer, ink-jet printer, or the like, or dot-impact printer.

Basics of an object size change process as the characteristic feature of the first embodiment will be explained below. Objects include a window, icon, figure, image, character font, and the like, i.e., data on the display screen, which serve as targets to be enlarged/reduced.

When a mouse cursor is adjusted to an arbitrary position in an object, the CPU 1 specifies that object as a size change target. That is, the CPU 1 specifies the object as the size change target if the mouse cursor is included at any position in the object even if it is not accurately adjusted to the object frame. The CPU 1 checks whether the right or left button of the mouse has been pressed, and launches an object size enlargement or reduction process on the basis of this checking result.

In this case, upon pressing the left button, the enlargement process is launched; upon pressing the right button, the reduction process is launched. Such size change process is done gradually (stepwise) in accordance with the length of time for which the left or right button is held down. That is, while either button is held down continuously, the size change process for gradually enlarging or reducing the object size along with the continuous operation time continues. When the continuous operation is canceled by releasing the button, the CPU 1 quits the size change process, and determines the size at that point as the changed size.

Figure 2:
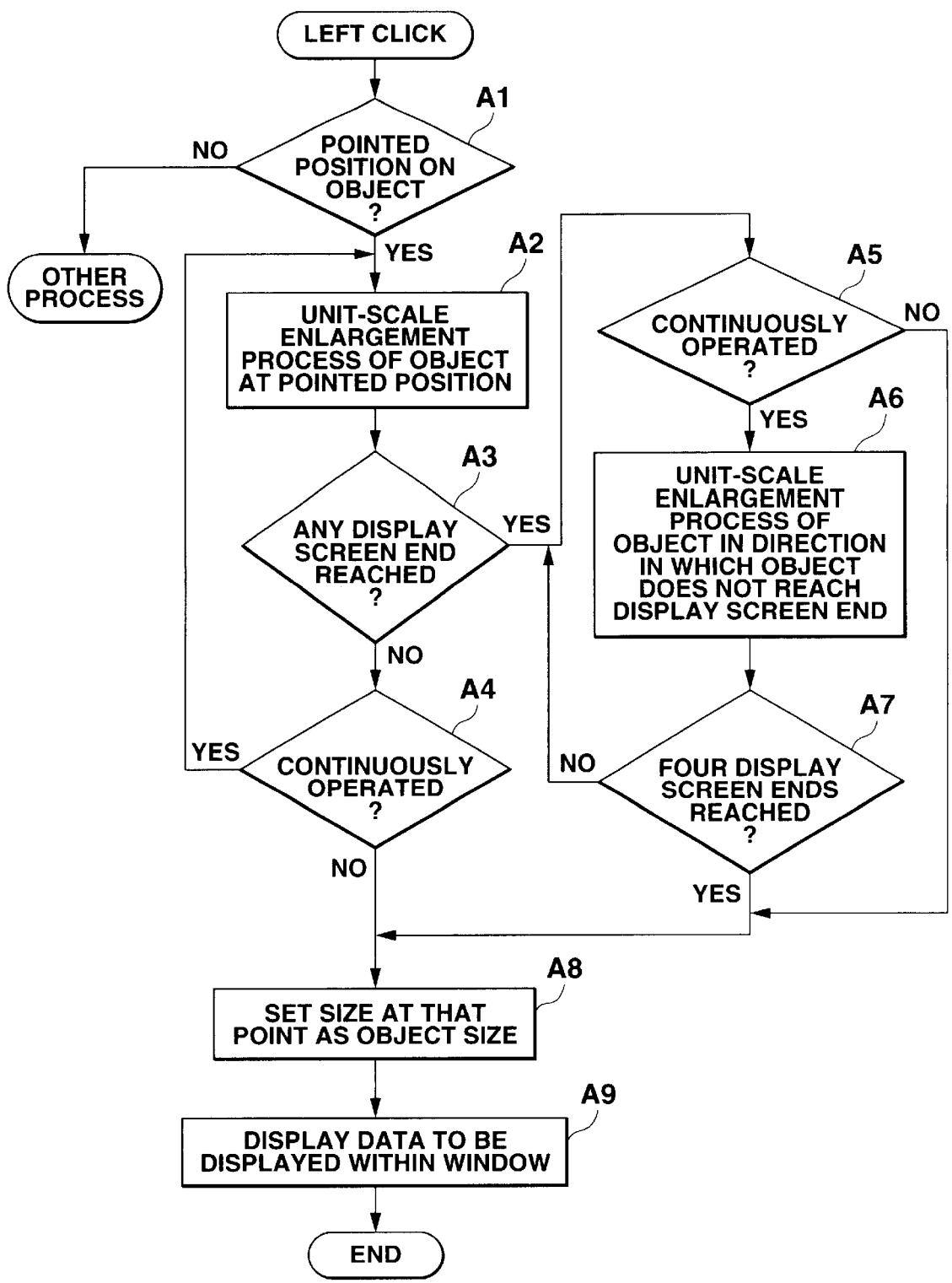
FIG. 2 is a flow chart showing an object size enlargement process, which is launched upon pressing the left button of a mouse.

The object size change process will be explained below with reference to the flow charts shown in FIGS. 2 and 3. Note that programs for implementing respective functions described in these flow charts are stored in the storage medium 3 in the form of readable program codes and the CPU 1 sequentially executes operations according to those program codes.

FIGS. 4A through 5E show examples of the size change processes of a rectangular object (window, figure, or the like). FIGS. 4A through 4F show the processes upon enlarging the object size, and FIGS. 5A through 5E show the processes upon reducing the object size. When the left button of the mouse is pressed, the flow chart shown in FIG. 2 is executed. The current position of the mouse cursor is acquired, and it is checked if that pointed position is located on an object (step A1).

If the mouse cursor is located at an arbitrary position in the object, as shown in FIG. 4A, that object is specified as a size change target; if the mouse cursor lies outside any object, the control starts other processes.

If the mouse cursor is located on an object, a process for enlarging that object by unit scale is done (step A2). In this case, the four sides that define the rectangular object are uniformly enlarged by a predetermined dot unit (see FIG. 4B).

It is checked if any side of the object has reached an end portion of the display screen by the enlargement process (step A3). If N in step A3, the flow returns to the process for enlarging the four sides of the object by unit scale (step A2) under the condition that the left button is continuously operated (step A4).

FIG. 4C shows a state wherein the four sides of the original object have been uniformly enlarged by several scales upon repeating the aforementioned stepwise enlargement process. In this case, since the upper and left sides of the object reach end portions of the display screen, that state is detected in step A3, and a process for enlarging the object by unit scale in directions in which the sides of the object do not reach display screen ends is done (step A6) under the condition that the left button is continuously operated (step A5).

In this case, only the right and lower sides of the object are enlarged by the predetermined dot unit, as shown in FIG. 4D. The flow then advances to step A7 to check if the object has reached any of the four display screen ends. If N in step A7, the enlargement process is repeated (step A6) under the condition that the left button is continuously operated.

In this case, when the object is enlarged from the state shown in FIG. 4D to that shown in FIG. 4E, the lower side of the object also reaches an end portion of the display screen. In this case, when only the right side of the object is enlarged, and all the four sides of the object finally reach the display screen ends, as shown in FIG. 4F, the enlargement process is automatically stopped, and the flow advances to step A8 to determine the size at that point as the changed size of the object.

In this manner, while the left button is held down, the object is enlarged by unit scales until it reaches the display screen size. When the left button is released to cancel the continuous operation before the object reaches the display screen size (step A4 or A5), the enlargement process is stopped at that point, and the size at that point is determined as the changed size of the object (step A8).

If that object is a window, a process for converting contents stored as a file corresponding to the window, the size of which has changed, into display data, and displaying the converted display data within that window frame is done (step A9). Note that the display process of display data within the window frame may be done every time the window frame is enlarged.

Figure 3:
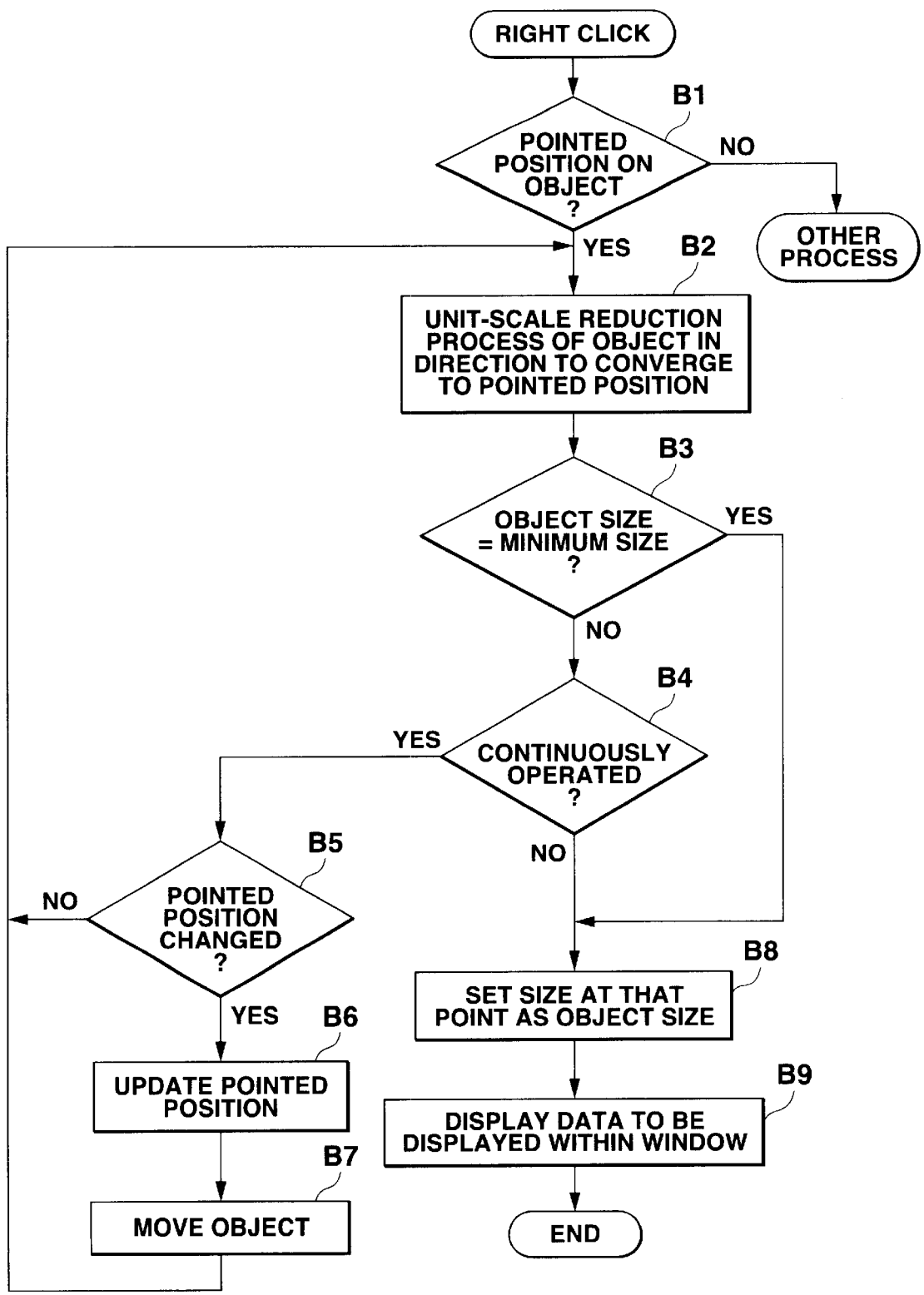
FIG. 3 is a flow chart showing an object size reduction process, which is launched upon pressing the right button of the mouse.

On the other hand, when the right button of the mouse is pressed, the flow chart shown in FIG. 3 is executed. The current position of the mouse cursor is acquired, and it is checked if the mouse cursor is located on an object (step B1). If the mouse cursor lies outside any object, the control executes other processes. However, if the mouse cursor is located on an object, as shown in FIG. 5A, the position in the object which is pointed by the mouse cursor is specified, and a process for reducing the object by unit scale (predetermined dot unit) in a direction to converge to that pointed position is done (step B2).

Figure 6A:
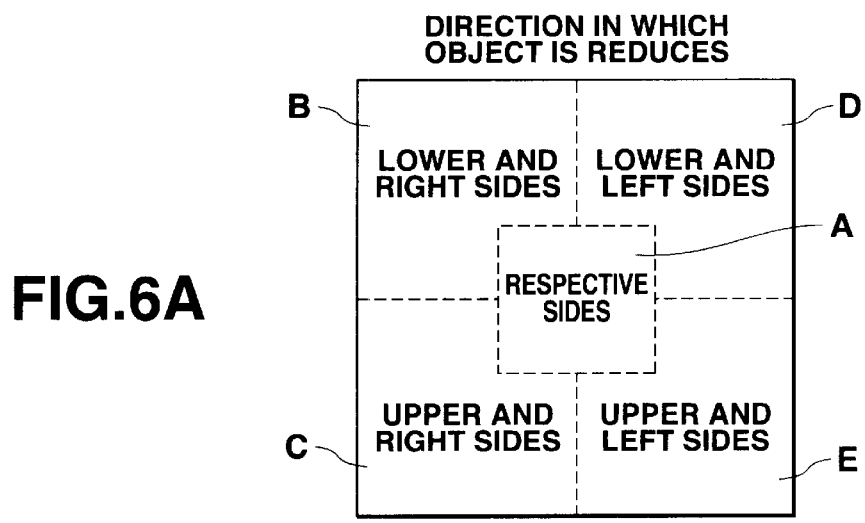
FIG. 6A is a view for explaining the direction of reduction of an object in correspondence with the object pointed position.

Assuming that the interior of an object is segmented into five regions, i.e., central region A, upper left region B, lower left region C, upper right region D, and lower right region E, as shown in FIG. 6A, one of these five regions A to E in which the position pointed by the mouse cursor is located is specified, and the direction in which the object is reduced is determined based on the specified region. That is, the directions to reduce objects are defined in regions A to E, as shown in FIG. 6A.

That is, if the pointed position is in central region A, a reduction direction that moves all the sides of a rectangular object in directions to converge to the pointed position is defined, and if upper left region B, a reduction direction that moves the lower and right sides in a direction to converge to the pointed position are defined; if lower left region C, the upper and right sides; if upper right region D, the lower and left sides; and if lower right region E, the upper and left sides.

FIG. 5A shows a case wherein the position pointed by the mouse cursor is in lower right region E. In this case, unit-scale reduction is done to uniformly move the upper and left sides of the rectangular object in a direction to converge to the pointed position by a predetermined dot unit, as shown in FIG. 5B.

Figure 6B:
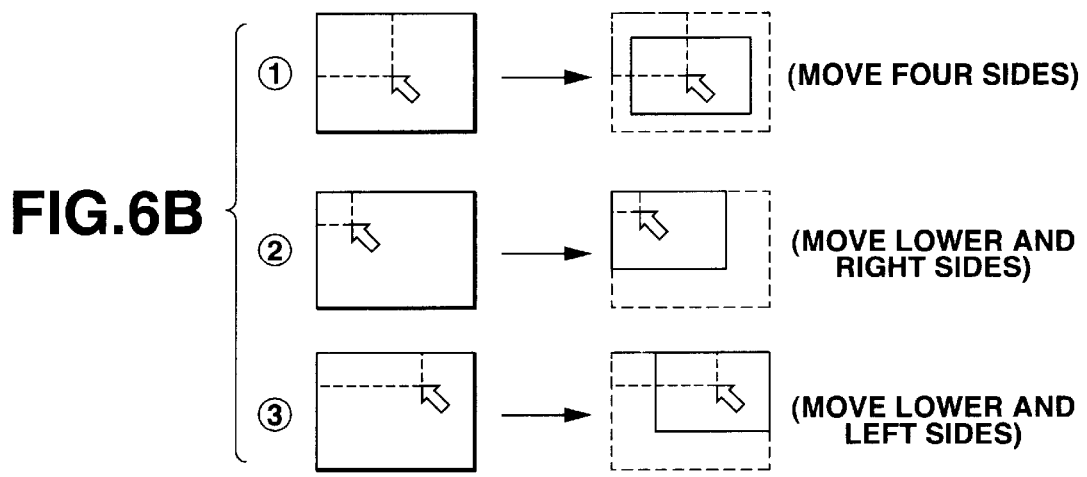
FIG. 6B is a view showing an example.

Note that FIG. 6B shows cases wherein the pointed position is in other regions. That is, the pointed position is in central region A (1), upper left region B (2), and upper right region D (3). In these cases, unit-scale reduction is done to uniformly move the four sides (1), the lower and right sides (2), and the lower and left sides (3) in a direction to converge to the pointed position by a predetermined dot unit.

Upon completion of the unit-scale reduction process of the object according to the pointed position, the flow advances to step B3 to check if the object has reached a minimum size. That is, the reduced object size is acquired, and is compared with the minimum size which is fixedly set in advance, thus checking if the object has reached the minimum size. As a result, if the object has not reached the minimum size, yet, it is checked if the pointed position has changed (step B5) under the condition that the right button of the mouse is continuously operated (step B4).

Figure 6C:
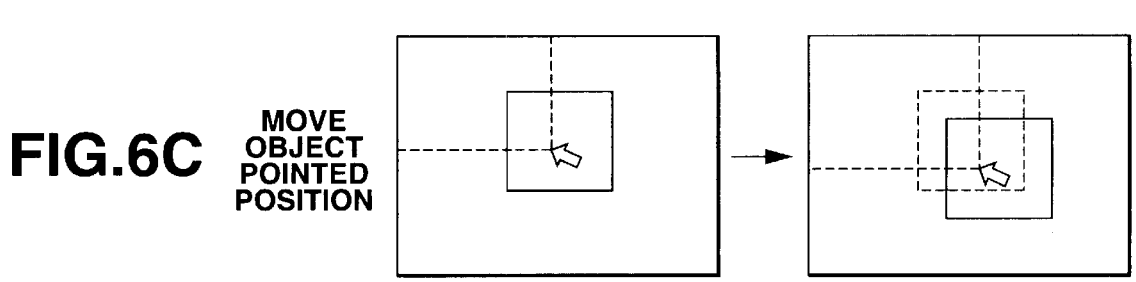
FIG. 6C is a view showing movement of an object in correspondence with movement of the object pointed position.

Assuming that the mouse cursor has moved and its pointed position has changed, as shown in FIG. 5C, the flow advances to step B6 to update the pointed position in accordance with the movement of the mouse cursor, and to move the object in that direction by an amount corresponding to the movement of the mouse cursor (step B7). That is, FIG. 6C shows this state, and the object is moved to track movement of the mouse cursor. After that, the flow returns to step B2 to determine one of regions A to E in which the updated pointed position is located, and the unit-scale reduction process is done accordingly.

Assuming that the mouse cursor has moved from the position shown in FIG. 5A to that shown in FIG. 5C, since the pointed position has moved within lower right region E, unit-scale reduction for converging the upper and left sides of the object toward the pointed position is done. Furthermore, when the right button is held down while moving the mouse cursor toward the lower right corner of the display screen, since the aforementioned operation is repeated, the object is reduced by unit scales while moving toward the lower right corner, as shown in FIGS. 5D and 5E.

If the object has reached the minimum size (step B3) by repeating such reduction process or if the right button is released to cancel its continuous operation before the object reaches the minimum size (step B4), the reduction process is stopped at that point, and the size at that point is determined as the changed size of the object (step B8).

When the object is a window, a process for converting contents stored as a file corresponding to the size-changed window into display data, and displaying the converted display data within that window frame is done (step B9). Note that the display process of display data within the window frame may be done every time the window frame is reduced.

As described above, according to the first embodiment, by simply pointing an object on the display screen by pressing the left or right button, the pointed object can be gradually enlarged or reduced in accordance with the duration of time for which the button is pressed. Hence, the object size can be arbitrarily changed by simple operation without dragging the mouse, and the needs for accurate adjustment of the mouse cursor to the object frame and a work space for moving the mouse in the conventional apparatus can be obviated.

In this case, the object is gradually enlarged by unit scales while the left button of the mouse is held down, and the object is gradually reduced by unit scale while the right button is held down. Hence, enlargement/reduction can be easily selected, and when the button is released, the enlargement/reduction process is stopped to determine the size at that point as the changed size of the object.

Furthermore, when the object is enlarged, the object can be enlarged up to the display screen size as the maximum size independently of the current position of the object on the display screen. That is, even when the object is located at a corner of the display screen, it can be enlarged up to the display screen size. When the object is reduced, the object is reduced in a direction to converge toward the pointed position of the mouse cursor, and can be moved to track movement of the mouse cursor. Hence, the object can be placed at a desired position while being reduced.

In the first embodiment described above, the hold operation (continuous operation) of the mouse button has been exemplified. Alternatively, by holding down an enlargement/reduction key, an object may be gradually enlarged/reduced in accordance with the duration of time for which the key is held down.

Furthermore, the position desired on the display screen may be touched by an input pen. That is, an input device that instructs enlargement/reduction is arbitrary. Moreover, the present invention is not limited to the hold operation, and start/stop of enlargement/reduction may be instructed by one-touch operation.

In the first embodiment, upon reducing the display size of an object, the direction in which the object is reduced is determined in accordance with the pointed position on the object display region. Also, upon enlarging the display size of an object, the direction in which that object is enlarged may be determined in accordance with the pointed position on the object display region.

(Second Embodiment)

The second embodiment of the present invention will be described below with reference to FIGS. 7 and 8. In the first embodiment described above, an object is simply enlarged/reduced. However, in the second embodiment, an object is converted into another associated object during its enlargement/reduction process.

That is, an icon is converted into its associated window during an enlargement process of that icon, or a window is converted into its associated icon during a reduction process of that window. Note that enlargement/reduction of an object is designated by button operation of the mouse. In the second embodiment, upon pressing either the right or left button, the type of object pointed by the mouse cursor is determined, and if the pointed object is an icon, an enlargement process is launched; if it is a window, a reduction process is launched. The enlargement/reduction process is gradually done by unit scales while the mouse button is held down, and if the mouse button is still held down even after object conversion, the enlargement/reduction process by unit scales continues.

Figure 7:
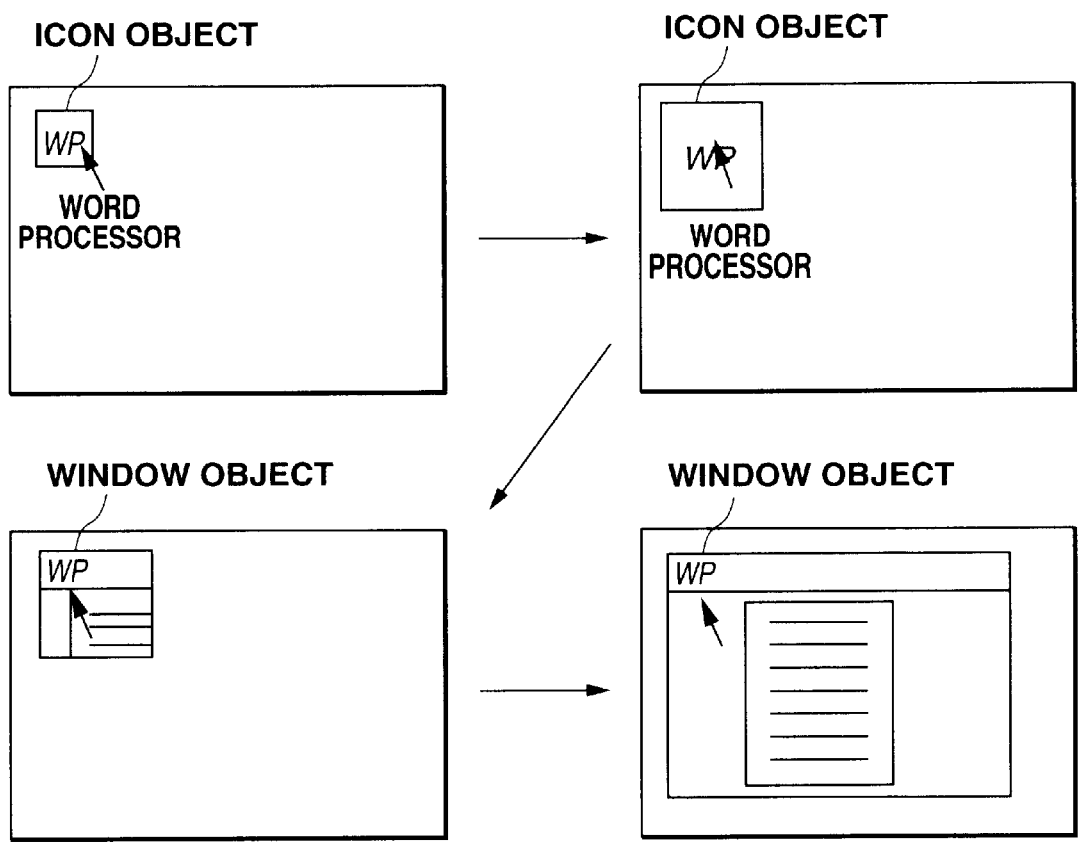
FIG. 7 shows the conversion processes of an icon object into a corresponding window object during its enlargement in the second embodiment of the present invention, and shows, in turn from the upper left display screen, the icon object as being designated as a target to be enlarged, the icon object enlarged to a predetermined size, the window object after conversion from the icon object, and the enlarged window object.

FIG. 7 exemplifies a case wherein an icon is converted into its associated window during an enlargement process of that icon, and the converted window is further enlarged. Note that an icon on the display screen is pointed by the mouse cursor, as shown in the upper left display screen in FIG. 7.

Figure 8:
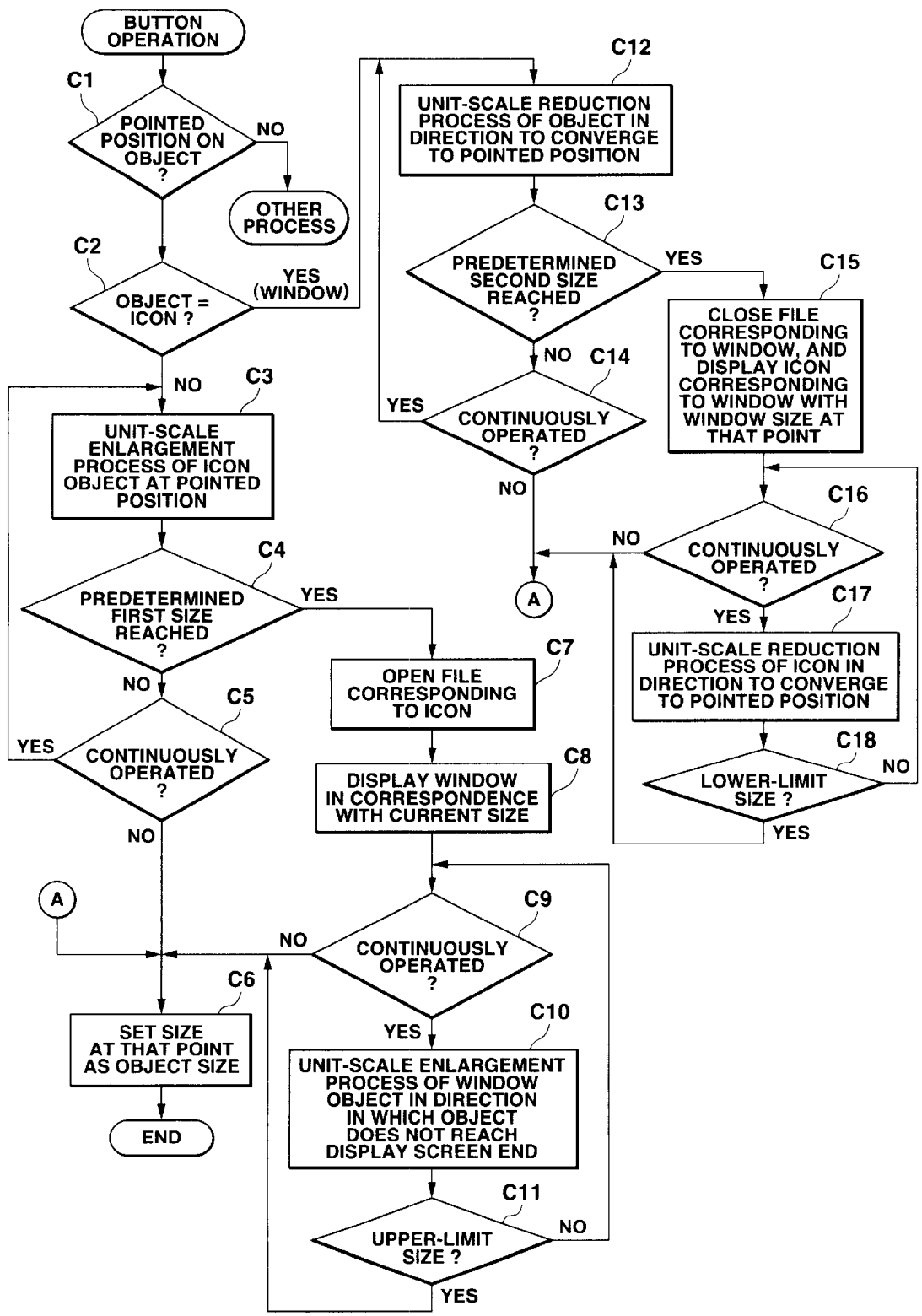
FIG. 8 is a flow chart which is launched upon pressing a mouse button in the second embodiment.

FIG. 8 is a flow chart which is executed upon pressing the mouse button (either the right or left button). It is checked if the position pointed by the mouse cursor is located at an arbitrary position in an object (step C1). If the pointed position lies outside any object, other processes are done; otherwise, the type of object is determined (step C2).

If the object is an icon, a process for enlarging an icon object at that pointed position by unit scale is done (step C3). The enlargement process in this case is the same as that in the first embodiment described above. That is, when any of the sides of the object has reached an end portion of the display screen, the object is enlarged in directions in which no sides reach screen ends. In step C4, the enlarged object size is compared with a predetermined first size (maximum size of the icon) to check if the object has reached the maximum size of the icon. If the object has not reached the maximum size of the icon, the unit-scale enlargement process is repeated (step C3) under the condition that the mouse button is continuously operated (step C5).

With this operation, the icon object is gradually enlarged. When the continuous operation is canceled before the icon object reaches its maximum size, the enlargement process is stopped at that point, and the size at that point is determined as the changed size of the icon object.

On the other hand, the upper right display screen in FIG. 7 exemplifies a case wherein the icon object has been enlarged up to its maximum size. In this manner, when the icon object has been enlarged up to its maximum size, the flow advances to step C7 to open a file corresponding to that icon, and to display a window object that matches the current size at that position (step C8).

More specifically, when the icon object has been enlarged up to its maximum size, the icon object is converted into its associated window object. In this case, the window object is displayed to have the same size and position as those of the icon object before conversion, and the contents of a file corresponding to the icon are converted into display data and are displayed in the window frame of that window.

The lower left display screen in FIG. 7 shows a window display example in this case. In this state, when the mouse button is still held down (step C9), a process for enlarging the window object by unit scale in directions in which the window does not reach end portions of the display screen is done (step C10). The enlargement process is repeated (step C10) while the operation continues (step C9) until the window reaches a predetermined upper-limit size (step C11). If the window has reached the upper-limit size or the continuous operation is canceled, the enlargement process is stopped, and the size at that point is determined as that of the window object (step C6).

A case will be explained below wherein a window is reduced. If it is determined in step C2 that the object is a window object, a process for reducing the window object by unit scale in a direction to converge to the pointed position is done as in the aforementioned first embodiment (step C12). It is then checked if the window size has reached a predetermined second size (minimum size of the window) as a result of reduction (step C13). If the window size has not reached the minimum size, the reduction process is repeated (step C12) while the operation continues (step C14).

When the continuous operation is canceled before the window object reaches its minimum size, the reduction process is stopped at that point, and the size at that point is determined (step C6). If the window object has reached the minimum size, the flow advances to step C15 to close a file corresponding to that window, and display an icon corresponding to the window with the window size at that point.

More specifically, when the window object has been reduced to its minimum size, the window object is converted into its associated icon object. In this case, the icon object is displayed to have the same size and position as those of the window object before conversion. In this state, when the mouse button is still held down (step C16), the icon object is reduced by unit scale in a direction to converge to the pointed position (step C17).

The reduction process is repeated (step C17) while the operation continues (step C16) until the icon object reaches a predetermined lower-limit size (step C18). When the icon object has reached the lower-limit size or the continuous operation is canceled, the reduction process is stopped, and the size at that point is determined as that of the icon object (step C6).

As described above, according to the second embodiment, when an icon object is enlarged beyond a predetermined size during its enlargement process, the icon object is converted into a corresponding window object; when a window object is reduced below a predetermined size during its reduction process, the window object is converted into a corresponding icon object. Hence, by only changing the size of a first object, the first object can be converted into its associated second object.

In this case, since the second object is converted to have the same size as the current size of the first object upon object conversion, the user can visually recognize that the objects before and after conversion are associated with each other, thus preventing recognition errors and confusion of these objects.

As in the first embodiment described above, by simply pointing an object on the display screen by button operation of the mouse, the pointed object can be gradually enlarged or reduced in accordance with the duration of time for which the button is pressed. Hence, the object size can be arbitrarily changed by simple operation without dragging the mouse, and the needs for accurate adjustment of the mouse cursor to the object frame and a work space for moving the mouse in the conventional apparatus can be obviated. The same applies not only to the first object before conversion but also to an object after conversion. That is, the object after conversion can be enlarged/reduced by simple operation.

In the second embodiment described above, an icon object is converted into a window object during its enlargement process. In this case, the window object is displayed with a size corresponding to the current size of the icon object, as described in step C3 in FIG. 8. However, the window may be displayed with a size larger than the current size of the icon object (e.g., a predetermined minimum window size).

On the other hand, a window object is converted into an icon object during its reduction process. In this case, the icon object is displayed with a size corresponding to the current size of the window object at that point, as described in step C15 in FIG. 8. However, the icon object may be displayed with a size smaller than the current size of the window object (e.g., a predetermined maximum icon size). Furthermore, the present invention is not limited to the icon and window, but may be applied to other objects. That is, the types of objects are not particularly limited as long as a first object is converted into its associated second object. The object is designated by the mouse button but may be designated by a key or input pen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A window display controller for displaying stored display data stored within a window display region having an arbitrary display size, said window display controller comprising:

measurement means for measuring a designation operation time of a first or second designation operation with respect to a display position of the window display region;

first size change means for enlarging the display size of the window display region in accordance with the designation operation time measured by said measurement means upon the first designation operation;

second size change means for reducing the display size of the window display region in accordance with the designation operation time measured by said measurement means upon the second designation operation; and display control means for controlling display of the stored display data within the window display region, the display size of which has been changed by said first or second size change means.

2. A controller according to claim 1, wherein the first designation operation is a designation operation using a first button provided on a mouse which is used to designate a designation position on the display screen, and the second designation operation is a designation operation using a second button provided on the mouse.

3. A controller according to claim 1, wherein:

the display position designated by the second designation operation is an arbitrary display position within the window display region, and said first size change means includes means for reducing the display size of the window display region in a direction to converge the window display region toward the designated display position.

4. A storage medium having stored thereon computer-readable program codes for implementing:

a function of measuring a designation operation time of a first or second designation operation with respect to a display position of a window display region;

a function of sequentially enlarging a display size of the window display region in accordance with the measured designation operation time upon the first designation operation;

a function of sequentially reducing the display size of the window display region in accordance with the measured designation operation time upon the second designation operation; and a function of controlling display of stored display data within the window display region, the display size of which has been changed by the enlargement or reduction.

* * * * *